US007419255B2

(12) United States Patent
Kawaguchi et al.

(10) Patent No.: US 7,419,255 B2
(45) Date of Patent: Sep. 2, 2008

(54) METHOD AND APPARATUS FOR FORMING WHITE INKJET IMAGES ON FABRIC

(75) Inventors: Takashi Kawaguchi, Nagoya (JP); Hidemasa Sawada, Nagoya (JP); Akiko Mizuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/951,605

(22) Filed: Sep. 29, 2004

(65) Prior Publication Data

US 2005/0117009 A1 Jun. 2, 2005

(30) Foreign Application Priority Data

Nov. 28, 2003 (JP) ............................ 2003-400781

(51) Int. Cl.
*B41J 2/01* (2006.01)
*B41J 2/205* (2006.01)
*G01D 11/00* (2006.01)

(52) U.S. Cl. .......................... 347/102; 347/100; 347/15

(58) Field of Classification Search ................. 347/102, 347/101, 100, 15
See application file for complete search history.

(56) References Cited

U.S. PATENT DOCUMENTS 4,739,415 A * 4/1988 Toyono et al. .............. 358/296
4,880,465 A 11/1989 Loria et al.
5,485,189 A * 1/1996 Ebata ......................... 347/102
6,244,700 B1 * 6/2001 Kimura et al. .............. 347/102
6,344,819 B1 * 2/2002 Pond .......................... 342/100
6,428,143 B2 * 8/2002 Irihara et al. .................. 347/43
6,505,928 B1 * 1/2003 Landau et al. .............. 347/102
6,513,924 B1 2/2003 Goldberg et al.
6,769,766 B2 * 8/2004 Suzuki et al. ............... 347/100
6,989,054 B2 * 1/2006 Tanabe et al. ............ 106/31.86
7,134,749 B2 * 11/2006 Ben-Zur et al. ............. 347/101
2002/0060728 A1 5/2002 Koizumi et al.
2003/0142168 A1 * 7/2003 Suzuki et al. ................. 347/43
2004/0189772 A1 * 9/2004 Arai ........................... 347/102
2004/0246319 A1 * 12/2004 Ito et al. ..................... 347/100

FOREIGN PATENT DOCUMENTS

EP 0 679 759 A1 11/1995
EP 1 344 804 A1 9/2003
JP B2 2619677 3/1997
JP A 2000-103995 4/2000

* cited by examiner

*Primary Examiner*—Stephen D Meier
*Assistant Examiner*—Leonard S Liang
(74) *Attorney, Agent, or Firm*—Oliff & Berridge, PLC

(57) ABSTRACT

Provided is a method for forming inkjet images, which imparts sufficient visibility and good laundering fastness to a white inkjet image formed on fabric. The method is to form white inkjet images on fabric by inkjet recording using a white inkjet ink containing hollow polymer microparticles as a white pigment, and has the steps of performing a plurality of printings superimposingly on fabric by inkjet recording, performing preliminary heating and fixing at least one time during performing the plurality of printings superimposingly, and performing main heating and fixing after the final printing.

7 Claims, 2 Drawing Sheets

1

METHOD AND APPARATUS FOR FORMING WHITE INKJET IMAGES ON FABRIC

BACKGROUND OF THE INVENTION

1. Field of the Invention

The present invention relates to a method and apparatus for forming white inkjet images of excellent visibility on fabric.

2. Description of the Related Art

Titanium dioxide ($TiO_2$) is well known as a white pigment with good hiding power, but titanium dioxide is also heavy, with a specific gravity of about 4.2. Consequently, when it is used as a pigment for a white inkjet ink, the pigment settles when the ink is allowed to stand for an extended period. Preventing this ink settling is difficult, and up to now it has been impossible to achieve adequate dispersion stability with an ink containing titanium dioxide.

Ink clogging and improper discharge can occur if the pigment in an ink settles in the ink passage within an inkjet head. Also, since titanium dioxide is a ceramic, it is extremely hard and accelerates wear to the nozzle portions of an inkjet head.

In view of this, it has been proposed that hollow polymer microparticles be used instead of titanium dioxide as the pigment for a white inkjet ink (Japanese Patent No. 2,619,677 and Japanese Patent Application Laid-Open No. 2000-103995). Hollow polymer microparticles have a specific gravity of close to 1 and therefore are not prone to settling, which solves the problem of ink clogging caused by the settling of pigment.

Nevertheless, even if a white inkjet ink containing hollow polymer microparticles as a white pigment is used, when a printed image is formed by a conventional ink-jet recording method on a dark-colored fabric, such as black T-shirt fabric, the visibility of the printed image is extremely poor because the ink penetrates into the fabric far more than into paper or a film.

In addition, an image printed on fabric needs to have good laundering fastness, but here again the required characteristics cannot be achieved with a conventional inkjet recording method.

SUMMARY OF THE INVENTION

In view of this, it is an object of the present invention to provide a novel method for forming inkjet images, which imparts sufficient visibility and good laundering fastness to an inkjet image formed on fabric, and to provide an apparatus that makes use of this method.

The present inventors discovered that in printing by inkjet recording on a dark-colored fabric using a white inkjet ink in which, as the white pigment, hollow polymer microparticles are used, if a plurality of printings are performed superimposingly, and preliminary heating and fixing is performed at least one time during performing the plurality of printings superimposingly, there will be a marked improvement in the visibility of the white image printed on dark fabric and good laundering fastness will be obtained, and more particularly that if the preliminary heating and fixing is performed superimposingly in non-contact fashion on the fabric by using a hot air apparatus, a far infrared irradiation device, or the like, then misalignment of the plurality of printings performed superimposingly can be prevented.

Specifically, the present invention is a method for forming white inkjet images on fabric by inkjet recording using a white inkjet ink containing hollow polymer microparticles as a white pigment, comprising the step of performing a plurality of printings superimposingly on fabric by inkjet recording, the step of performing preliminary heating and fixing at least one time during performing the plurality of printings superimposingly, and the step of performing main heating and fixing after the final printing.

The present invention also provides an apparatus for forming inkjet images, comprising: a mounting table on which fabric is placed; an inkjet head for discharging a white inkjet ink containing hollow polymer microparticles as a white pigment; a carriage for moving the inkjet head in the main scanning direction relative to the mounting table; a conveyance device for moving the carriage in a sub-scanning direction intersecting the main scanning direction, relative to the mounting table; and a preliminary heating and fixing device for heating the fabric placed on the mounting table to a temperature of 180 to 200° C.

With the method of the present invention for forming white inkjet images, a white inkjet ink containing hollow polymer microparticles as a white pigment is used, a plurality of printings are performed superimposingly on fabric by inkjet recording, preliminary heating and fixing is performed at least one time during performing the plurality of printings superimposingly, and main heating and fixing is performed after the final printing, so a white image with excellent visibility can be formed on the fabric, and in particular a vivid white image can be formed on fabric of dark colors such as black, navy blue, blue, and brown. This allows good laundering fastness to be imparted to white printed images.

With the apparatus of the present invention for forming white inkjet images, the above-mentioned method of the present invention for forming white inkjet images can be easily implemented. In particular, since this inkjet image formation apparatus comprises a mounting table on which fabric is mounted, an inkjet head that moves with respect to the mounting table, and a preliminary heating and fixing device for heating the fabric placed on the mounting table to a temperature of 180 to 200° C., there is no need to remove the fabric from the mounting table during the plurality of printings or during the preliminary heating and fixing. Accordingly, misalignment of the white printed images can be prevented even though the printing and preliminary heating and fixing are carried out repeatedly.

DESCRIPTION OF THE PREFERRED EMBODIMENTS

Figure 1:
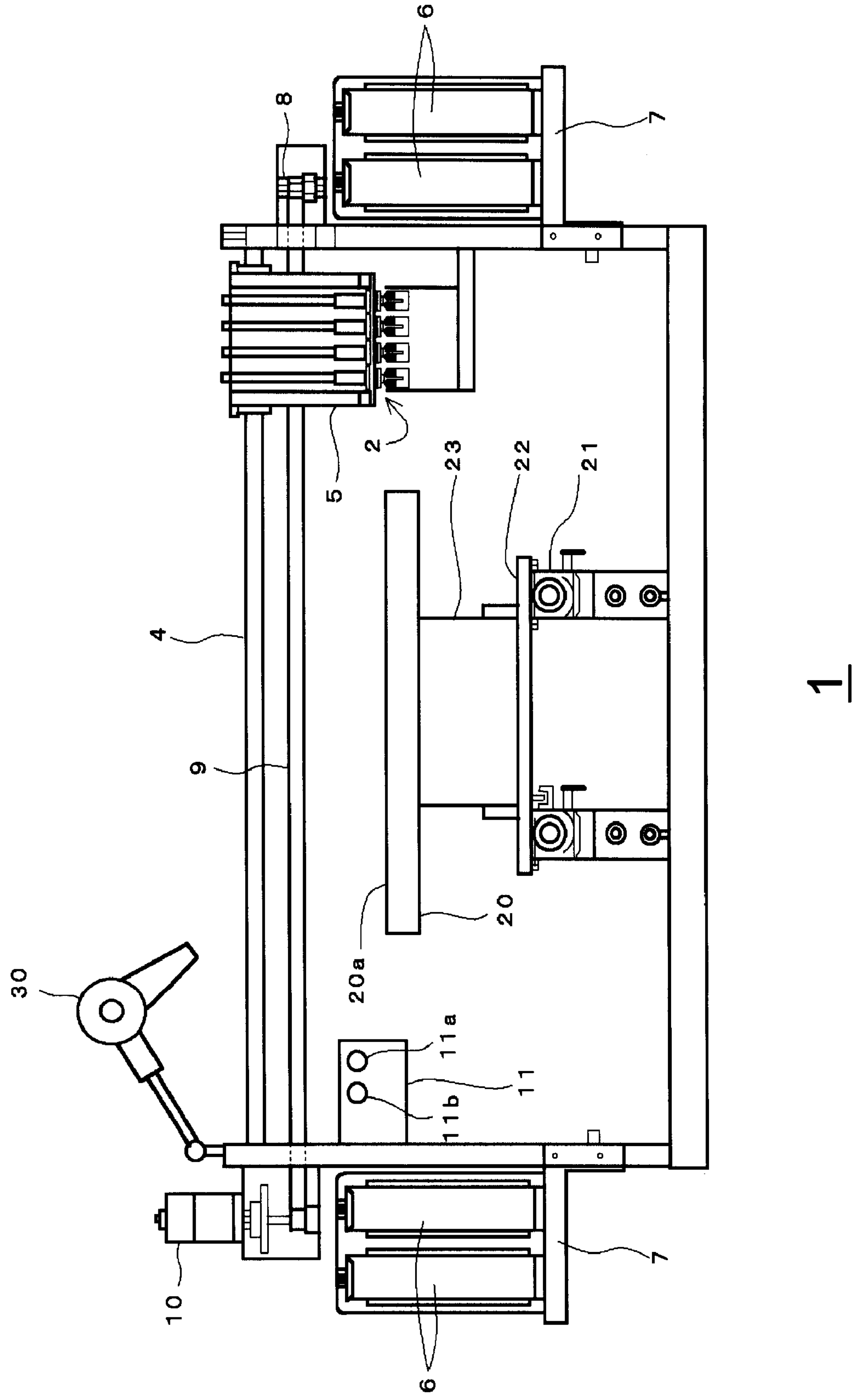
FIG. 1 is a front view of an inkjet image formation apparatus that can be used to implement the method of the present invention for forming white inkjet images.

The present invention will now be described in detail.

The method of the present invention for forming white inkjet images involves the use of a white inkjet ink containing hollow polymer microparticles as a white pigment.

These hollow polymer microparticles can be any type used in conventional white inkjet inks and discussed in Japanese Patent No. 2,619,677, Japanese Laid-Open Patent Application Laid-Open No. 2000-103995, and so on. Specifically, the hollow polymer microparticles are composed of highly crosslinked polymer particles that have a void in their interior, are insoluble in the aqueous solvent of the ink, do not chemically react with the binder resin of the ink, and have excellent heat and solvent resistance. As to the size of the hollow polymer microparticles, the outside diameter is approximately 0.1 to 1 μm and the inside diameter is approximately 0.05 to 0.8 μm. These hollow polymer microparticles are dried until the water in the interior of the particles disappears and the particle interior becomes empty, and the air in the interior and the polymer layer scatter light and provide a hiding effect.

Commercially available hollow polymer microparticles can be used, examples of which include SX866(A) and SX866(B) available from JSR, and OP-62 available from Rohm and Haas.

The hollow polymer microparticles are preferably contained in the white inkjet ink in an amount of 3 to 30 wt % in terms of solids. If the hollow polymer microparticle content is too low, the white printed image will have decreased visibility, but if the content is too high, the ink viscosity will rise and the onset of structural viscosity will lead to clogging of the nozzles in the inkjet head and to improper ink discharge.

The white inkjet ink used in the present invention preferably contains an aqueous resin emulsion at an amount of 3 to 60 wt % in terms of solids and an aqueous solvent in addition to the above-mentioned hollow polymer microparticles.

The aqueous resin emulsion is used as a dispersant for the hollow polymer microparticles, or as a binder for fixing the hollow polymer microparticles to the fabric. This aqueous resin emulsion can be any type used in conventional inkjet inks, examples of which include acrylic resin emulsions, styrene/maleic anhydride copolymer resin emulsions, urethane resin emulsions, vinyl acetate resin emulsions, vinyl acetate/acrylic copolymer resin emulsions, and vinyl acetate/ethylene copolymer resin emulsions. Since the fixability of the hollow polymer microparticles is improved when preliminary heating and fixing or main heating and fixing are performed after the inkjet image has been formed on the fabric, it is particularly favorable for the resin that forms the aqueous resin emulsion to be one with a glass transition point Tg of 40° C. or lower, and more specifically an acrylic resin emulsion is preferred.

The average volumetric size of the resin particles that make up the aqueous resin emulsion is preferably 10 to 100 nm, and more preferably 10 to 50 nm. There are no particular restrictions on the properties of the aqueous resin emulsion, and it can be anionic, cationic, nonionic, etc. Also, it may be a microemulsion, a gloss emulsion, a reaction type emulsion, an emulsion that crosslinks at normal temperature, an emulsion with a two-phase structure, or the like.

If the amount of the aqueous resin emulsion contained is too small, there will be a decrease in the fixability of the white printed image, but if the amount is too large, the viscosity of the ink will rise and tend to result in poor discharge, so a range of 3 to 60 wt % in terms of solids is preferable.

It is preferable to use a low-volatile water-soluble solvent and water as the aqueous solvent. A low-volatile water-soluble aqueous solvent will inhibit the drying of the ink in the nozzles of the inkjet head and prevent ink clogging, and is preferably one or more types selected from among glycerol, diethylene glycol, propylene glycol, propylene glycol monobutyl ether, propylene glycol monopropyl ether, dipropylene glycol monobutyl ether, dipropylene glycol monopropyl ether, tripropylene glycol monobutyl ether, and the like.

The low-volatile water-soluble solvent is preferably added to the ink in an amount of 10 to 84 wt %. If the amount of the the low-volatile water-soluble solvent added is too small, its addition will have little effect, but if the amount is too large, because the low-volatile water-soluble solvent has a high viscosity, the viscosity of the ink will rise and result in poor discharge, and heat fixability will decrease, making it difficult to raise the laundering fastness.

The white inkjet ink can also contain additives such as dispersants such as a water-soluble polymer, surfactants, pH adjusters, anti-foaming agents, and preservatives.

The white inkjet ink used in the present invention may be obtained by dispersing above-mentioned components in a ball mill, sand mill, attritor, roll mill, agitator mill, Henschel mixer, colloid mill, ultrasonic homogenizer, per mill, jet mill, Angmill, Mecafusion made by Hosokawa Micron, or the like, and then removing coarse particles as needed by centrifugation, filtration, or the like to obtain a pigment dispersion.

The white inkjet ink used in the present invention is preferably adjusted to a viscosity of no more than 20 cps and a surface tension of 25 to 45 mN/m.

With the method of the present invention for forming white inkjet images, a white inkjet ink containing hollow polymer microparticles is used to perform a plurality of printing superimposingly on fabric by inkjet recording, preliminary heating and fixing is performed at least one time during the performing the plurality of printings superimposingly, and main heating and fixing is performed after the final printing.

Examples of the fabric here include woven, fabric, knit fabric, and nonwoven cloth. There are no particular restrictions on the fibers that make up the fabric, but examples include cotton, silk, flax, hemp, wool, and other such natural fibers; polyamide, polyester, acrylic, and other such synthetic fibers; rayon, acetate, and other such regenerated and semi-synthetic fibers; and blends of these fibers. One specific example is 100% cotton T-shirt material (jersey), for which there is high demand.

For an even more vivid white image to be formed, the color of the fabric is preferably a dark color such as black, navy blue, blue, or brown.

There are no particular restrictions on the inkjet recording method, which can be a piezo method that makes use of piezoelectric elements for the printer head, a thermal method in which ink is discharged by a sudden change in the volume of the ink brought about by thermal energy, or another such method. The inkjet head configuration can be either a serial type or line type.

In forming an inkjet image by performing a plurality of printings superimposingly on fabric by inkjet recording, the number of times the printing is repeated can be suitably determined according to the type of fabric, the required visibility of the print, and other such factors, and in the case of 100% cotton T-shirt material (jersey), a blend of cotton and polyester, or another such fabric, 2 to 8 printings are preferable.

The preliminary heating and fixing is performed at least one during performing the plurality of printings superimposingly. This preliminary heating and fixing entails heating and drying the ink enough that the ink will not stick to a finger when the finger is pressed on the printed surface. This preliminary heating and fixing can be accomplished by bringing a heat roll or the like into contact with the fabric from the non-printed side or another such method, but in terms of preventing misalignment of the white image obtained by performing a plurality of printings superimposingly, it is preferable to heat the fabric in non-contact fashion, and in terms of facilitating temperature adjustment and allowing the preliminary heating and fixing to be performed while the fabric is still mounted in the inkjet image formation apparatus, it is preferable to use a hot-air heating apparatus with which hot air of about 180 to 200° C. can be blown from near the printed side of the fabric in the print discharge direction. Drying may be inadequate if the hot air temperature is below 180° C., but exceeding 200° C. is also undesirable because the fabric may be scorched.

Specific examples of the hot-air heating apparatus include a heat gun and a dryer, but a heat gun is particularly favorable because it allows the preliminary heating and fixing to be completed in only 5 to 40 seconds.

A far infrared irradiation device with which fabric placed on the mounting table is irradiated with far infrared rays with a wavelength of 3 to 10 μm can also be employed as the preliminary heating and fixing device, or a hot plate or the like is used as the mounting table on which the fabric is placed to heat the fabric directly to between 180 and 200° C.

The preliminary heating and fixing need not be performed after each printing is performed, and when initial printing is followed by printing from one to four more times, for example, the preliminary heating and fixing is performed (1) after the initial printing, (2) after the initial printing and after the second printing, or (3) after the initial printing, after the second printing, and after the third printing, which allows the white index of the final print to be raised to 30 or higher.

The main heating and fixing is performed after printing has been repeated a specific number of times. This main heating and fixing entails heating and drying the ink enough that the binder component will form a film and the ink will adhere sufficiently to the fabric.

Since no superimposing printing is performed after the main heating and fixing, this main heating and fixing may be performed after the fabric has been removed from the image formation apparatus.

A specific example of how this main heating and fixing is carried out is a method involving heating for 10 to 60 seconds at 150 to 200° C. with a hot press, conveyor oven, or the like.

Figure 2:
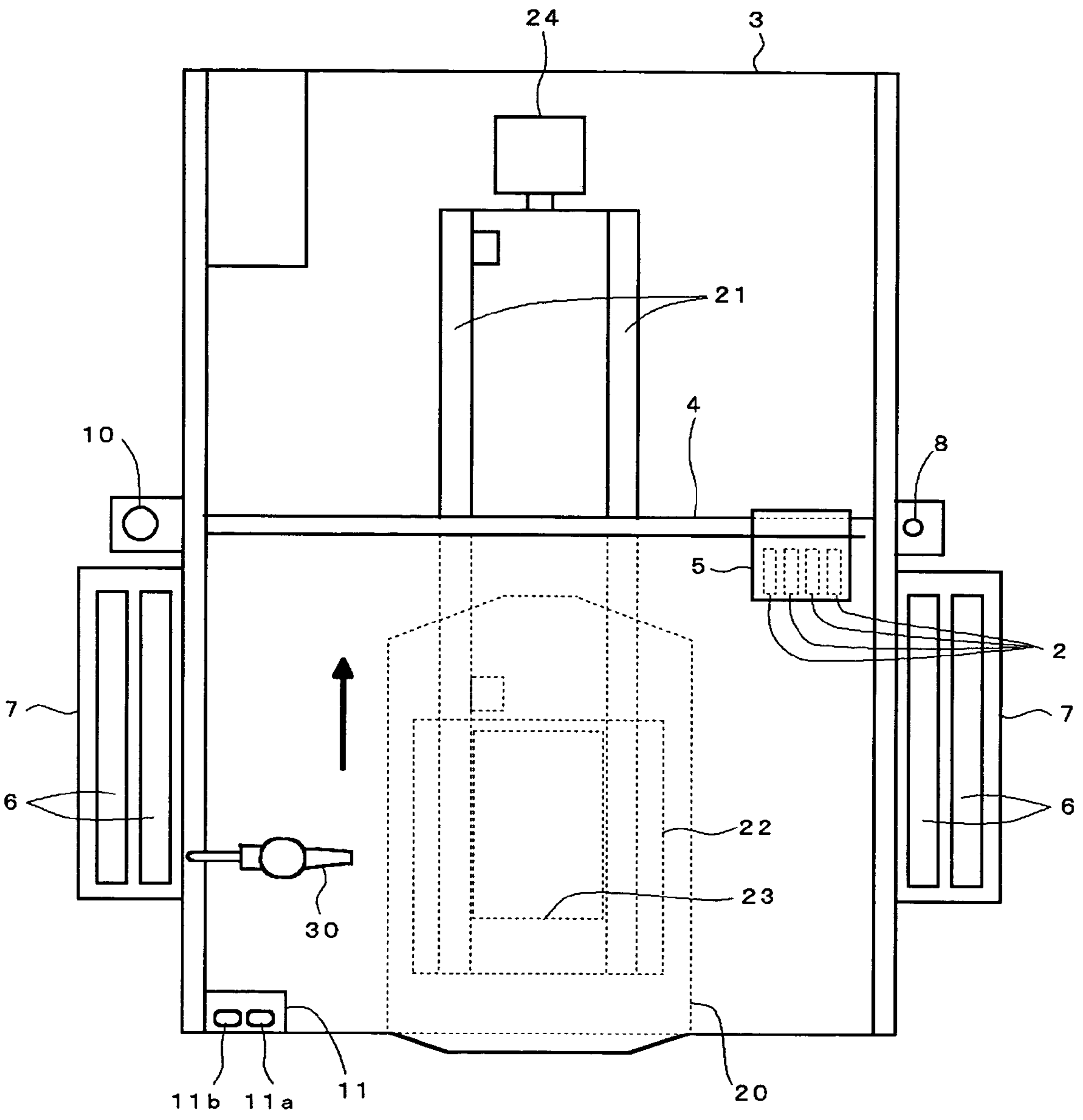
FIG. 2 is a plan view of an inkjet image formation apparatus that can be used to implement the method of the present invention for forming white inkjet images.

FIG. 1 is a front view of one aspect of the inkjet image formation apparatus of the present invention that can be used to implement the method of the present invention for forming white inkjet images, and FIG. 2 is a plan view of the same.

This inkjet image formation apparatus 1 is equipped with a serial type inkjet head 2, and has a frame 3, a slide rail 4 mounted horizontally on the frame 3, and a carriage 5 that moves slidably along the lengthwise direction (main scanning direction) of the slide rail 4. The inkjet head 2 is a piezo type, with one head disposed for each of four colors (such as white, yellow, magenta, and cyan) for discharging ink of each color, and is mounted on the carriage 5. A holder 7 for ink tanks 6 communicating with the inkjet head 2 is provided on the outside of the frame 3.

A pair of pulleys 8 is provided on the vertical parts of the frame 3, an endless belt 9 is wound around the pair of pulleys 8, and the carriage 5 is attached to this endless belt 9. A carriage motor 10 is linked to one of the pulleys 8.

Therefore, when the carriage motor 10 is driven, the inkjet head 2 attached to the carriage 5 moves in the main scanning direction.

A mounting table 20, on which the fabric is placed and which is removably fixed, is provided within the frame 3. The top 20*a* of the mounting table 20 is a flat work surface. This mounting table 20 is fixed by a support column 23 on a slide base 22 slidably attached on a slide mechanism 21 composed of a pair of rails extending in the sub-scanning direction, which perpendicularly intersects the main scanning direction. A mounting table motor 24 is provided at one end of the slide mechanism 21, and a conveyance mechanism linked to this mounting table motor 24 allows the mounting table 20 to be moved in the sub-scanning direction.

A heat gun 30 is attached to the frame 3 as a hot-air heating apparatus with which hot air of 180 to 200° C. can be blown onto the fabric placed on the mounting table 20.

A control panel 11 equipped with a switch 11*a* for switching on and off the inkjet recording of this apparatus, and a switch 11*b* for switching the heat gun 30 on and off is provided to the front of the inkjet image formation apparatus 1.

This inkjet image formation apparatus 1 is used to form a white inkjet ink image on fabric as follows. First, one of the ink tanks 6 is filled with a white inkjet ink containing the above-mentioned hollow polymer microparticles.

Next, the fabric (such as a dark-colored T-shirt) is placed and fixed on the mounting table 20 after any wrinkles have been smoothed out.

When the switch 11*a* on the control panel 11 is operated, the carriage 5 to which the inkjet head 2 is attached moves back and forth in the main scanning direction, the mounting table 20 moves in the sub-scanning direction, and white inkjet ink is discharged from the inkjet head 2, thereby forming a white inkjet image. As shown by the arrow in FIG. 2, the formation of this white inkjet image is accompanied by the gradual movement of the mounting table 20 over the slide mechanism 21, from the control panel 11 side to the mounting table motor 24 side. Once the initial printing is complete, the mounting table 20 returns to its home position on the control panel 11 side.

When the switch 11*b* of the heat gun 30 is operated while the mounting table is gradually returning to its home position, the heat gun 30 moves in the sub-scanning direction relative to the mounting table 20 while hot air of 180 to 200° C. is blown for 5 to 40 seconds onto the fabric that has undergone the initial printing. Therefore, the entire printed fabric undergoes preliminary heating and fixing.

After this, inkjet recording in which the same white inkjet image is printed over the above-mentioned white inkjet image, and preliminary heating and fixing is carried out as many times as necessary.

Upon completion of the final printing, the fabric is removed from the mounting table, and main heating and fixing is performed with a separate heating apparatus.

An aspect of the inkjet image formation apparatus of the present invention used to implement the method of the present invention for forming white inkjet images was described above through reference to the drawings, but the inkjet image formation apparatus of the present invention is not limited to or by the aspect depicted here.

For instance, the carriage 5 to which the inkjet head 2 is attached may be moved in the sub-scanning direction, rather than in the sub-scanning direction, by driving the mounting table 20 with the mounting table motor 24.

EXAMPLES

Examples 1 to 5 and Comparative Examples 1 and 2

(1) Preparation of Ink

White inkjet inks 1 and 2 were prepared by mixing the components in Table 1 and Table 2, respectively. The properties of the resulting inks are given in the same tables.

TABLE 1

White ink 1

| | wt % |
|---|---|
| Ink composition | |
| Acrylic resin emulsion (Johncryl 390 made by Johnson Polymer) | 10.0 |
| Hollow polymer microparticles (SX866(A) made by JSR) | 10.0 |
| Diethylene glycol | 24.5 |
| Triethanolamine (pH regulator) | 0.5 |
| Water | 55.0 |
| Ink properties | |
| Viscosity | 5.9 cps |
| Surface Tension | 36.6 mN/m |
| pH | 8.47 |

TABLE 2

White ink 2

| | wt % |
|---|---|
| Ink composition | |
| Acrylic resin emulsion (Johncryl 390 made by Johnson Polymer) | 10.0 |
| Hollow polymer microparticles (SX866(A) made by JSR) | 15.0 |
| Diethylene glycol | 15.0 |
| Triethanolamine (pH regulator) | 0.5 |
| Water | 59.0 |
| Ink properties | |
| Viscosity | 5.8 cps |
| Surface Tension | 36.1 mN/m |
| pH | 8.20 |

(2) Printing on Dark Fabric and Evaluation

Each white ink obtained in (1) was placed in the inkjet image formation apparatus equipped with a heat gun shown in FIG. 1, superimposing printings and preliminary heating and fixing of a solid image were carried out on black fabric (100% cotton jersey) as shown in Tables 3 to 9, and this was followed by main heating and fixing (Examples 1 to 5 and Comparative Examples 1 and 2).

The preliminary heating and fixing here were accomplished by blowing 180° C. hot air for 10 seconds from the heat gun provided to the inkjet image formation apparatus. The main heating and fixing was accomplished by removing the fabric from the inkjet printer and heating it for 30 seconds with a 180° C. hot press.

After the printing (or after preliminary heating and fixing or main heating and fixing when preliminary heating and fixing or main heating and fixing were performed after printing), the reflection density (OD value) of the print was measured with a densitometer (Macbeth RD-914), the L*, a*, and b* values of the L*a*b* calorimetric system were respectively found with a calorimeter (Minolta CM2002), and the white index (W.I.) was calculated from the following equation.

$$W.I.=100-((100-L)^2+a^2+b^2)^{1/2}$$

For practical purposes, the white index calculated here is preferably at least 30.

After the fabric had undergone the main heating and fixing in the above examples and comparative examples, it was laundered using a household laundry detergent, and the reflection density before and after laundering was examined. These results are given in Tables 3 to 9.

TABLE 3

Comparative Example 1
Printing conditions: white ink 1, no preliminary heating and fixing

| | L* | a* | b* | W.I. | Reflection density (OD value) |
|---|---|---|---|---|---|
| First printing | 21.68 | −0.23 | −2.86 | 21.631 | 1.50 |
| Second printing | 23.45 | −0.45 | −3.13 | 23.388 | 1.45 |
| Third printing | 24.18 | −0.62 | −3.23 | 24.104 | 1.43 |
| Fourth printing | 24.10 | −0.67 | −3.26 | 24.022 | 1.42 |
| Fifth printing | 24.90 | −0.91 | −3.41 | 24.821 | 1.41 (B.L.) |
| Main heating and fixing | | | | | 1.41 (A.L.) |

[B.L.: before laundering, A.L.: after laundering]

TABLE 4

Example 1
Printing conditions: white ink 1, preliminary heating and fixing after each printing

| | L* | a* | b* | W.I. | Reflection density (OD value) |
|---|---|---|---|---|---|
| First printing | 23.28 | −0.17 | −2.79 | 23.232 | 1.52 |
| Prel. heating and fixing | | | | | |
| Second printing | 24.82 | −0.69 | −3.51 | 24.734 | 1.40 |
| Prel. heating and fixing | | | | | |
| Third printing | 28.61 | −0.92 | −3.80 | 28.506 | 1.28 |
| Prel. heating and fixing | | | | | |
| Fourth printing | 32.70 | −1.19 | −4.24 | 32.553 | 1.18 |
| Prel. heating and fixing | | | | | |
| Fifth printing | 36.38 | −1.53 | −4.10 | 36.226 | 1.07 (B.L.) |
| Main heating and fixing | | | | | 1.10 (A.L.) |

TABLE 5

Example 2
Printing conditions: white ink 1, preliminary heating and fixing only after first printing

| | L* | a* | b* | W.I. | Reflection density (OD value) |
|---|---|---|---|---|---|
| First printing | 24.52 | −0.78 | −3.09 | 24.450 | 1.41 |
| Prel. heating and fixing | | | | | |
| Second printing | 25.09 | −0.88 | −3.13 | 25.018 | 1.40 |
| Third printing | 24.92 | −0.80 | −3.27 | 24.848 | 1.40 |
| Fourth printing | 24.66 | −0.85 | −3.25 | 24.583 | 1.39 |
| Fifth printing | 25.67 | −0.90 | −3.43 | 25.583 | 1.37 (B.L.) |
| Main heating and fixing | | | | | 1.40 (A.L.) |

TABLE 6

Example 3
Printing conditions: white ink 1,
preliminary heating and fixing after first and second printings

| | L* | a* | b* | W.I. | Reflection density (OD value) |
|---|---|---|---|---|---|
| First printing | 23.94 | −1.15 | −3.65 | 23.844 | 1.42 |
| Prel. heating and fixing | | | | | |
| Second printing | 24.36 | −1.10 | −3.69 | 24.262 | 1.32 |
| Prel. heating and fixing | | | | | |
| Third printing | 29.30 | −1.07 | −3.72 | 29.193 | 1.22 |
| Fourth printing | 30.76 | −1.16 | −3.79 | 30.643 | 1.21 |
| Fifth printing | 30.54 | −1.25 | −3.81 | 30.426 | 1.23 (B.L.) |
| Main heating and fixing | | | | | 1.25 (A.L.) |

TABLE 7

Example 4
Printing conditions: white ink 1,
preliminary heating and fixing after first, second, and third printings

| | L* | a* | b* | W.I. | Reflection density (OD value) |
|---|---|---|---|---|---|
| First printing | 23.42 | −1.15 | −3.78 | 23.320 | 1.51 |
| Prel. heating and fixing | | | | | |
| Second printing | 26.38 | −1.21 | −3.83 | 26.270 | 1.35 |
| Prel. heating and fixing | | | | | |
| Third printing | 30.50 | −1.17 | −3.80 | 30.386 | 1.21 |
| Prel. heating and fixing | | | | | |
| Fourth printing | 33.48 | −1.14 | −3.81 | 33.358 | 1.14 |
| Fifth printing | 33.76 | −1.18 | −3.82 | 33.639 | 1.13 (B.L.) |
| Main heating and fixing | | | | | 1.15 (A.L.) |

TABLE 8

Comparative Example 2
Printing conditions: white ink 2, no preliminary heating and fixing

| | L* | a* | b* | W.I. | Reflection density (OD value) |
|---|---|---|---|---|---|
| First printing | 29.88 | −0.854 | −5.067 | 29.692 | 1.23 |
| Second printing | 34.924 | −1.129 | −5.901 | 34.647 | 1.09 |
| Third printing | 37.681 | −1.351 | −6.398 | 37.339 | 1.03 |
| Fourth printing | 33.974 | −1.108 | −6.642 | 33.632 | 1.10 |
| Fifth printing | 27.012 | −0.655 | −6.409 | 26.728 | 1.33 (B.L.) |
| Main heating and fixing | | | | | 1.33 (A.L.) |

TABLE 9

Example 5
Printing conditions: white ink 1,
preliminary heating and fixing after every printing

| | L* | a* | b* | W.I. | Reflection density (OD value) |
|---|---|---|---|---|---|
| First printing | 31.695 | −0.888 | −5.251 | 31.488 | 1.17 |
| Prel. heating and fixing | | | | | |
| Second printing | 36.706 | −1.176 | −5.851 | 36.425 | 1.05 |
| Prel. heating and fixing | | | | | |
| Third printing | 39.465 | −1.17 | −6.278 | 39.115 | 0.97 |
| Prel. heating and fixing | | | | | |
| Fourth printing | 43.966 | −1.537 | −6.442 | 43.576 | 0.88 |
| Prel. heating and fixing | | | | | |
| Fifth printing | 45.03 | −1.543 | −6.563 | 44.618 | 0.86 (B.L.) |
| Main heating and fixing | | | | | 0.86 (A.L.) |

The above results show that with Examples 1 to 5, in which preliminary heating and fixing was performed during performing a plurality of printings superimposingly, the white index was higher than in Comparative Example 1 (Table 3) and Comparative Example 2 (Table 8) in which there was no preliminary heating and fixing at all during performing the plurality of printings superimposingly, and in particular, that when preliminary heating and fixing were performed at least after the initial printing and after the second printing during the five printings, the white index was greatly increased, and the white index after main heating and fixing was at least 30, which is a desirable level for practical use.

It can also be seen that the printed images in the various examples of the present invention exhibited extremely good laundering fastness, and the reflection density after main heating and fixing was unchanged before and after laundering.

The method of the present invention for forming white inkjet images is useful when printing white inkjet images on fabric, and particularly on dark colored fabric, at a high level of visibility, and when good laundering fastness is imparted to the white inkjet images.

The entire disclosure of the specification, claims, summary and drawings of Japanese Patent Application No. 2003-400781 filed on Nov. 28, 2003 is hereby incorporated by reference.

What is claimed is:

1. A method for forming white inkjet images on fabric by inkjet recording using a white inkjet ink containing hollow polymer microparticles as a white pigment, comprising:

performing a plurality of printings superimposingly on fabric by inkjet recordings, the performing the plurality of printings including at least performing a first printing and performing a second printing;

performing preliminary heating and fixing at least one time during the performing the plurality of printings; and performing main heating and fixing after a final printing of the plurality of printings, wherein the performing the first printing prints a first image on an area of the fabric and, after the first printing is performed, the performing the second printing prints a second image on the area of the fabric over the first image printed during the performing the first printing, the first image and the second image being the same.

2. The method for forming white inkjet images according to claim 1, wherein the white inkjet ink contains an aqueous resin at an amount of 3 to 60 wt % in terms of solids, hollow polymer microparticles at an amount of 3 to 30 wt % in terms of solids, and an aqueous solvent.

3. The method for forming white inkjet images according to claim 2, wherein the performing the preliminary heating and fixing is accomplished by blowing hot air of 180 to 200° C. for 5 to 40 seconds, while the performing the main heating and fixing is accomplished by hot pressing at 150 to 200° C. for 10 to 60 seconds.

4. The method for forming white inkjet images according to claim 2, wherein, when the performing the first printing is followed by performing printings from one to four more times, the performing the preliminary heating and fixing is performed at least (1) after the performing the first printing, (2) after the performing the first printing and after the performing the second printing, or (3) after the performing the first printing, after the performing the second printing, and after performing a third printing.

5. The method for forming white inkjet images according to claim 1, wherein the performing the preliminary heating and fixing is accomplished by blowing hot air of 180 to 200° C. for 5 to 40 seconds, while the performing the main heating and fixing is accomplished by hot pressing at 150 to 200° C. for 10 to 60 seconds.

6. The method for forming white inkjet images according to claim 5, wherein, when the performing the first printing is followed by performing printings from one to four more times, the performing the preliminary heating and fixing is performed at least (1) after the performing the first printing, (2) after the performing the first printing and after the performing the second printing, or (3) after the performing the first printing, after the performing the second printing, and after performing a third printing.

7. The method for forming white inkjet images according to claim 1, wherein, when the performing the first printing is followed by performing printings from one to four more times, the performing preliminary heating and fixing is performed at least (1) after the performing the first printing, (2) after the performing the first printing and after the performing the second printing, or (3) after the performing the first printing, after the performing the second printing, and after performing a third printing.

* * * * *